United States Patent
Chen et al.

(10) Patent No.: US 11,965,061 B2
(45) Date of Patent: Apr. 23, 2024

(54) CATALYST FOR COPOLYMERIZATION OF CARBON DIOXIDE AND EPOXY AND METHOD OF MANUFACTURING THE SAME

(71) Applicant: Changzhou University, Changzhou (CN)

(72) Inventors: Qun Chen, Changzhou (CN); Mingyang He, Changzhou (CN); Junfeng Qian, Changzhou (CN); Shengchun Chen, Changzhou (CN); Zhonghua Sun, Changzhou (CN); Weiyou Zhou, Changzhou (CN); Zenan Ji, Changzhou (CN)

(73) Assignee: Changzhou University, Changzhou (CN)

( * ) Notice: Subject to any disclaimer, the term of this patent is extended or adjusted under 35 U.S.C. 154(b) by 0 days.

(21) Appl. No.: 17/876,498

(22) Filed: Jul. 28, 2022

(65) Prior Publication Data

US 2023/0159700 A1    May 25, 2023

(51) Int. Cl.
*C08G 64/34*    (2006.01)
*C08G 64/02*    (2006.01)

(52) U.S. Cl.
CPC ......... *C08G 64/34* (2013.01); *C08G 64/0208* (2013.01); *C08G 2310/00* (2013.01)

(58) Field of Classification Search
CPC . C08G 64/34; C08G 64/0208; C08G 2310/00
See application file for complete search history.

(56) References Cited

U.S. PATENT DOCUMENTS

2002/0082363 A1\* 6/2002 Zhao .................... C08G 64/305
                                                                525/523
2019/0193063 A1\* 6/2019 Díaz Velázquez ... B01J 37/0236

\* cited by examiner

*Primary Examiner* — Rabon A Sergent
(74) *Attorney, Agent, or Firm* — IDEA Intellectual Limited; Margaret A. Burke; Sam T. Yip

(57) ABSTRACT

A ternary composite catalyst of diethylzinc and yttrium trifluoroacetate loaded on chitin for copolymerization of carbon dioxide, epoxy cyclohexane and ethylene oxide is provided. The ternary composite catalyst exhibits strong catalytic activity for the ternary copolymerization of carbon dioxide, cyclohexane oxide and ethylene oxide. A high molecular weight and content of ester chain is maintained. Conventional rare earth ternary catalysts leave residues in the polymer, and the polymer requires rinsing with hydrochloric acid. The ternary composite catalyst can be removed through filtration. The average molecular weight of the resulting polycarbonate is more than 100,000, and the ester chain content is more than 90%. The resulting polymer has a lower metal content. The ternary composite catalyst can be used in agricultural film, disposable packaging and other polymer materials.

8 Claims, 3 Drawing Sheets

Chitin – prior loading

Chitin – after loading

CATALYST FOR COPOLYMERIZATION OF CARBON DIOXIDE AND EPOXY AND METHOD OF MANUFACTURING THE SAME

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE OF RELATED APPLICATION

This application is claiming priority from a Chinese patent application number 202111387764.7 filed on Nov. 22, 2021, the disclosure of which are incorporated herein by reference in their entirety.

FIELD OF THE INVENTION

The invention relates to the technical field of multicomponent copolymerization catalysts. In particular, it relates to a catalyst for copolymerization of carbon dioxide and epoxy compounds and a method of manufacturing thereof.

BACKGROUND OF THE INVENTION

Aliphatic polycarbonate prepared by copolymerization of carbon dioxide, epoxy cyclohexane and ethylene oxide has good biodegradability, thermal and mechanical properties. Aliphatic polycarbonate can be widely used in agricultural film, disposable packaging, elastomers, adhesives, coatings and other fields. The synthesis of aliphatic polycarbonate can effectively reuse a large amount of industrial waste greenhouse gas, like carbon dioxide. The use of aliphatic polycarbonate can reduce dependence on oil resources and avoid the white pollution caused by waste plastics.

Typically, the catalysts used for the ternary polymerization of carbon dioxide, hexane epoxide and ethylene oxide include zinc dicarboxylate catalyst, bimetallic cyanide catalyst and rare earth ternary catalyst. A zinc dicarboxylate catalyst exhibits high catalytic activity, but the molecular weight of the resulting polymer is low, and the activity cycle of this kind of catalyst is short. In general, the catalytic activity of conventional catalysts declines rapidly after 4 hours. The large proportion of polyether in the product structure of a bimetallic cyanide catalyst leads to poor thermal properties such as a less desirable glass transition temperature and initial thermal decomposition temperature. The synthesis method for a rare earth ternary catalyst is simple and easy to control. Furthermore, a rare earth ternary catalyst can be used to prepare aliphatic polycarbonate with a high molecular weight and high content of ester chains. However, a rare earth ternary catalyst is not easy to separate from the polymer, and the residual catalyst needs to be washed off with hydrochloric acid. The procedure is cumbersome and not environmentally friendly.

There is a need to develop a new type of ternary catalysts having high catalytic activity and being easily separated from the resulting polymer. The production cost of the polymer can be greatly reduced with higher yield.

SUMMARY OF THE INVENTION

This section is for the purpose of summarizing some aspects of the invention and to briefly introduce some further embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problems of a high catalytic activity ternary catalyst that can be easily separated from the polymer.

Accordingly, one aspect of the present invention provides a catalyst for copolymerization of carbon dioxide and epoxy. The catalyst is a ternary composite catalyst of diethylzinc and yttrium trifluoroacetate loaded on chitin, and the ternary composite catalyst is a composite compound formed by the reaction of diethylzinc and hydroxyl groups on chitin and a complexation with yttrium trifluoroacetate.

In a further embodiment of the present invention, the catalyst is prepared by adding diethylzinc, yttrium trifluoroacetate, chitin and tetrahydrofuran into a closed reactor with magnetic stirring in a nitrogen atmosphere to react and form a mixture. Next, the mixture is distilled and concentrated to obtain the ternary composite catalyst of diethylzinc and yttrium trifluoroacetate loaded on chitin.

In a further embodiment of the present invention, the molar ratio of diethylzinc, yttrium trifluoroacetate and chitin is 20:1:5 to 20.

In a further embodiment of the present invention, 20 ml of tetrahydrofuran is added to every 0.01 mol of diethyl zinc.

In a further embodiment of the present invention, the magnetic stirring is performed under a condition of 200 to 400 r/min stirring at 60° C. for 2.5 hours.

Another aspect of the present invention provides an application of catalyzing the copolymerization of carbon dioxide, epoxy cyclohexane and ethylene oxide to prepare polycarbonate by the ternary composite catalyst of diethylzinc and yttrium trifluoroacetate loaded on chitin.

In a further embodiment of the present invention, the application includes adding the ternary composite catalyst of diethylzinc and yttrium trifluoroacetate loaded on chitin, cyclohexane oxide, ethylene oxide and tetrahydrofuran into a dry 300-ml high-pressure reactor under a nitrogen atmosphere. Carbon dioxide is introduced, and a pressure is adjusted to 4 MPa. Polycarbonate is obtained by stirring at 80° C. for 9 hours at 1000 r/min.

In a further embodiment of the present invention, the molar ratio of cyclohexane oxide, ethylene oxide and diethylzinc for forming the ternary composite catalyst is 20:5: 0.25 to 2.

In a further embodiment of the present invention, 5 ml of tetrahydrofuran is added to each 0.1 mol of epoxy cyclohexane.

In a further embodiment of the present invention, the polycarbonate has a weight average molecular weight exceeding 100,000, and the content of ester chains in the polycarbonate is greater than 90% which is capable of forming into agricultural film and disposable packaging.

BRIEF DESCRIPTION OF THE DRAWINGS

In order to more clearly illustrate the technical solutions of the embodiments of the present invention, the drawings needed to be used in the description of the embodiments will be briefly introduced below. It is obvious that the drawings in the following description are only some embodiments of the present invention, and it is obvious for those skilled in the art to obtain other drawings based on these drawings without inventive exercise, in which.

DETAILED DESCRIPTION

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

Furthermore, reference herein to "one embodiment" or "an embodiment" means that a particular feature, structure, or characteristic described in connection with the embodiment is included in at least one implementation of the invention. The appearances of the phrase "in one embodiment" in various places in the specification are not necessarily all referring to the same embodiment, nor are separate or alternative embodiments mutually exclusive of other embodiments.

Example 1

Preparation of Chitin Supported Diethylzinc and Yttrium Trifluoroacetate Composite Catalyst:

In a nitrogen atmosphere, 0.5 mmol of yttrium trifluoroacetate, 0.01 mol of diethylzinc, 5 mmol of chitin and 20 ml of tetrahydrofuran are added to a closed reactor with magnetic stirring. The mixture is stirred at 60° C. for 2.5 hours, and then distilled and concentrated to obtain a ternary composite catalyst of diethylzinc and yttrium trifluoroacetate loaded on chitin.

Example 2

Characterization of Composite Catalyst of Diethylzinc and Yttrium Trifluoroacetate Loaded on Chitin:

The intensity and position of diffraction peaks are used to analyze the characteristic diffraction peaks prior and after the copolymerization by the diethylzinc and yttrium trifluoroacetate loaded on the chitin. The characteristic peaks indicate that diethylzinc and yttrium trifluoroacetate are loaded on the chitin. The subsequent ternary copolymerization of carbon dioxide, cyclohexane oxide and ethylene oxide can then be ensured. (RIGAKU d/max-2500 is used for the detection.)

Figure 1:
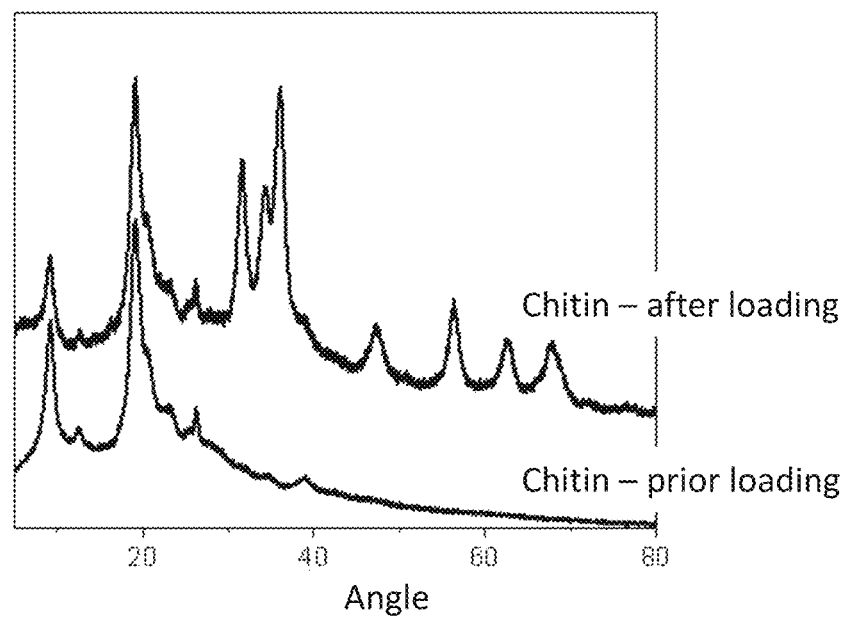
FIG. 1 is a graph showing powder diffraction of a ternary composite catalyst of diethylzinc and yttrium trifluoroacetate loaded on chitin according to an embodiment of the present invention.
Figure 2:
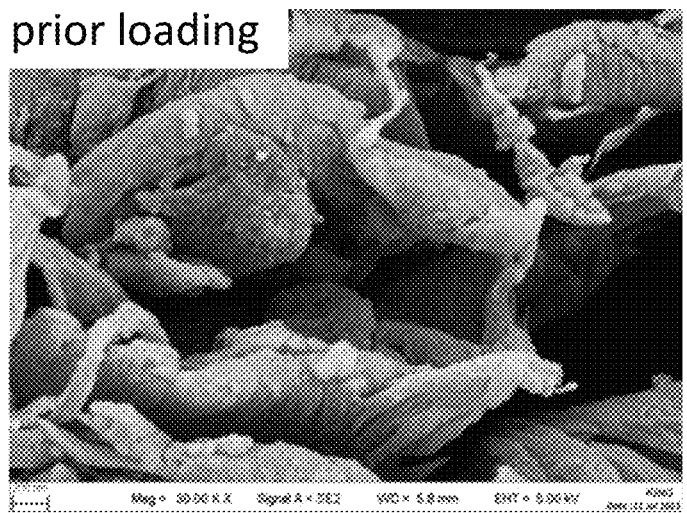
FIG. 2 is an SEM diagram of a ternary composite catalyst of diethylzinc and yttrium trifluoroacetate loaded on chitin according to an embodiment of the present invention.
Figure 2:
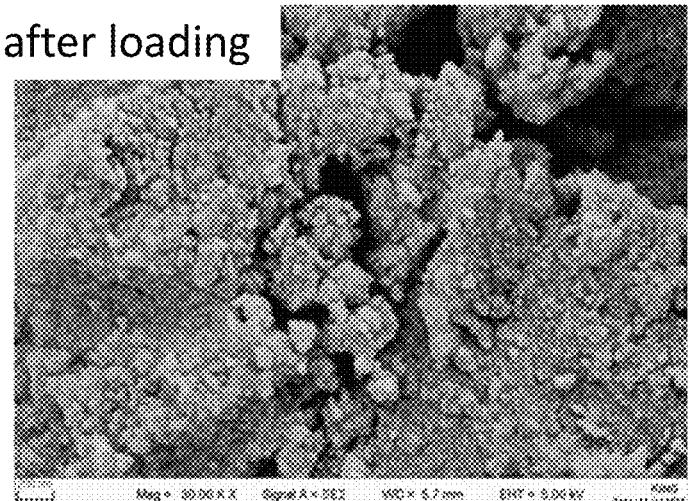

$ZnEt_2$ reacts with chitin to form Zn—O structural unit. The structure of the catalyst and the structure of the chitin are compared by XRD. As shown in FIG. 1, the characteristic diffraction peaks of ZnO are 31.6°, 34.6°, 36.4°, 47.8°, 56.3°, 62.8°, and 67.9°. The characteristic diffraction peaks of chitin are 22.5°, 15.6° and 34.5°.

Example 3

Ternary copolymerization of carbon dioxide, cyclohexane oxide and ethylene oxide catalyzed by the composite catalyst of diethylzinc and yttrium trifluoroacetate loaded on chitin:

The prepared ternary composite catalyst of diethylzinc and yttrium trifluoroacetate loaded on chitin, 20 ml epoxy cyclohexane, 2.5 ml ethylene oxide, and 20 ml tetrahydrofuran are added into a dry 300-ml high-pressure reactor. Carbon dioxide is then added to the reactor. The pressure is adjusted to 4 MPa. The mixture is stirred for reaction at 80° C. for 9 hours. Next, the mixture is filtered, and the ternary composite catalyst is recovered. 300 ml methanol is added to the filtrate to precipitate the polymer. The polymer is dried in vacuum at 50° C. The final product is white polycarbonate.

Example 4

Measurement of the weight average molecular weight of polycarbonate:

5.0 mg of polycarbonate is dissolved in 1 ml of tetrahydrofuran solution. The solution is filtered through a polytetrafluoroethylene filter membrane having 0.4 μm pore size. Approximately 20 μL of the filtrate is taken and added to the "LC-20AD GPC" sampler made by Shimadzu (Japan), and the weight average molecular weight of approximately 113, 000 is obtained through calculation.

Test conditions include column temperature at 40° C., tetrahydrofuran as eluant, flow rate of 0.6 ml/min. Detector: RID-10A detector. Calibration: molecular weight calibration by four different standardized polystyrenes with molecular weights ranging from 2000 to 500,000.

Example 5

Figure 3:
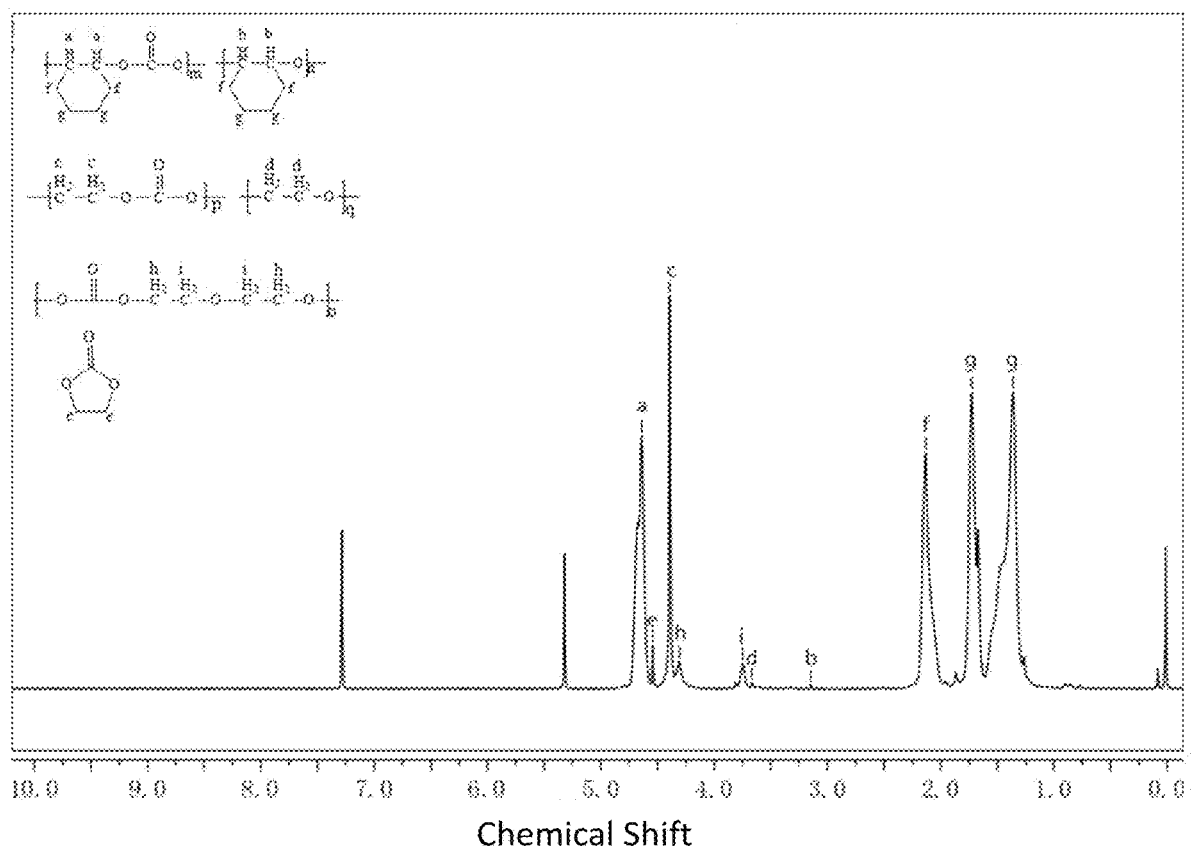
FIG. 3 is a schematic diagram of a nuclear magnetic resonance hydrogen spectrum of polycarbonate according to an embodiment of the present invention.

Measurement of the Content of Easter Chains in Polycarbonate:

AVANCE III 500M nuclear magnetic resonance instrument of Bruker (German produce) is used. The working frequency is 400 MHz ($^1H$). Super shielding magnet is used with a magnetic field strength of 9.4 T. The instrument is equipped with a forward broadband liquid probe. The nuclear detection range falls in $^1H$, $^{15}N$-$^{31}P$. The sensitivity of $^1H$ is larger than or equal to 300:1 (≥300:1) (0.1% EB). The $^{13}C$ sensitivity is larger than or equal to 170:1. (≥170:1) (ASTM). Deuterated chloroform is used as a solvent. Turning to FIG. 3, a schematic diagram of nuclear magnetic resonance hydrogen spectrum of polycarbonate is shown. The content of ester chains is 90%, the content of epoxy cyclohexane ester is 80%, and the content of epoxy ethane ester is 10%.

It is generally understood that [—O—Zn—O—] is the active center of a ternary composite catalyst. Chitin contains abundant hydroxyl groups in its molecular chain, which react with diethylzinc and then complex with yttrium trifluoroacetate. Furthermore, chitin molecular chain exhibits multi-layered nanostructure. These nano-woven structures provide rich attachment sites for metal nano catalysts, such that the active centers are distributed on the surface of the catalyst.

Example 6

Measurement of Metal Content in Polymers:

The metal content in the polymer is determined by Varian Vista-AX inductively coupled plasma atomic emission spectrometer (ICP-AES) (US produce). About 10 g of the polymer product is taken and put into a 100 ml $Al_2O_3$ crucible. The polymer is heated on an electric furnace at a high temperature until complete degradation. Then, the residual solid is put into a muffle furnace and heated to 800° C. for 4 hours. The crucible is taken out from the muffle furnace. The remaining sample is dissolved in hydrochloric acid and 100 ml is measured for analysis.

TABLE 3

| Catalyst | Polymer rinse cycle by hydrochloric acid | $Zn^{2+}$ (wt %) | $Y^{3+}$ (wt %) |
|---|---|---|---|
| Chitin-ZnEt2—Y(CF₃COO)₃ | 0 | 0.109 | 0.012 |
|  | 1 | 0.001 | 0.002 |
|  | 2 | 0.001 | 0.001 |
| Glycerol-ZnEt2—Y(CF₃COO)₃ | 0 | 1.55 | 0.074 |
|  | 1 | 0.016 | 0.002 |
|  | 2 | 0.002 | 0.001 |

The content of metal ions in the polymer prepared with the ternary composite catalyst of diethylzinc and yttrium trifluoroacetate loaded on chitin is reduced by more than 15 fold compared with that without the ternary composite catalyst. It shows that the ternary composite catalyst of diethylzinc and yttrium trifluoroacetate loaded on chitin is more easily removed than the conventional rare earth ternary catalyst. The ternary composite catalyst of diethylzinc and yttrium trifluoroacetate loaded on chitin can reduce or even avoid the acid pollution caused by washing and purification with hydrochloric acid of the final polymer. The use of the ternary composite catalyst of diethylzinc and yttrium trifluoroacetate loaded on chitin is viable in industrial application.

Example 7

Effects of composition ratio in the polymer on the end product:

Under a nitrogen atmosphere, yttrium trifluoroacetate, diethylzinc, chitin and tetrahydrofuran (20 ml) are added into a closed reactor with magnetic stirring. The mixture is stirred at 60° C. for 2.5 hours, distilled and concentrated to obtain a ternary complex catalyst of diethylzinc and yttrium trifluoroacetate loaded on chitin. The composition of added materials and their products are shown in Table 4.

TABLE 4

| Sample | Diethylzinc (mmol) | Yttrium trifluoroacetate (mmol) | Chitin (mmol) | Weight average molecular weight | Content of ester chains |
|---|---|---|---|---|---|
| 1 | 10 | 0.5 | 1 | 25,136 | 85.3% |
| 2 | 10 | 0.5 | 2.5 | 73,522 | 86.2% |
| 3 | 10 | 0.5 | 5 | 113,000 | 90.9% |
| 4 | 10 | 0.5 | 7.5 | 99,536 | 86.7% |
| 5 | 10 | 0.5 | 8.75 | 97,143 | 88.9% |
| 6 | 10 | 0.5 | 10 | 88,245 | 87.5% |

When the content of chitin is low, the catalytic activity is low because of less available active sites (—O—Zn—O—) of chitin which can combine with the diethylzinc. With the increase of chitin content, the catalytic activity increases gradually. When the carrier increases to a certain level, the efficiency decreases. This result may be caused by the shielding of the active site of the chitin because of the excessive concentration of chitin. When the molar ratio of diethylzinc, yttrium trifluoroacetate and chitin is 20:1:10, the three elements reach an optimal ratio. The weight average molecular weight of the resulting polycarbonate is more than 10 W, and the content of ester chains of the polycarbonate is more than 90%.

A ternary composite catalyst of diethylzinc and yttrium trifluoroacetate loaded on chitin for copolymerization of carbon dioxide, epoxy cyclohexane and ethylene oxide is provided. The ternary composite catalyst exhibits strong catalytic activity for the ternary copolymerization of carbon dioxide, cyclohexane oxide and ethylene oxide. A high molecular weight and content of ester chain is maintained. Conventional rare earth ternary catalyst leaves residues in the polymer, and the polymer requires rinsing by hydrochloric acid. The ternary composite catalyst can be removed through filtration. The average molecular weight of the resulting polycarbonate is more than 100,000, and the content of ester chain is more than 90%. The resulting polymer has a lower metal content. The ternary composite catalyst can be used in agricultural film, disposable packaging and other polymer materials.

It should be noted that the above-mentioned embodiments are only for illustrating the technical solutions of the present invention and not for limiting, and although the present invention has been described in detail with reference to the further embodiments, it should be understood by those skilled in the art that modifications or equivalent substitutions may be made on the technical solutions of the present invention without departing from the spirit and scope of the technical solutions of the present invention, which should be covered by the claims of the present invention.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

What is claimed is:

1. A catalyst for copolymerization of carbon dioxide and epoxy comprising:
   the catalyst being a ternary composite catalyst of diethylzinc and yttrium trifluoroacetate loaded on chitin, the ternary composite catalyst is a composite compound formed by the reaction of diethylzinc and hydroxyl groups on chitin and a complexation with yttrium trifluoroacetate.

2. The catalyst for copolymerization of carbon dioxide and epoxy of claim 1, wherein the catalyst is prepared by:

adding diethylzinc, yttrium trifluoroacetate, chitin and tetrahydrofuran into a closed reactor with magnetic stirring in nitrogen atmosphere to react and form a mixture; and distilling and concentrating the mixture to obtain the ternary composite catalyst of diethylzinc and yttrium trifluoroacetate loaded on chitin.

3. The catalyst for copolymerization of carbon dioxide and epoxy of claim 2, wherein the molar ratio of diethylzinc, yttrium trifluoroacetate and chitin is 20:1:5 to 20.

4. The catalyst for copolymerization of carbon dioxide and epoxy of claim 2, wherein 20 ml of tetrahydrofuran is added to every 0.01 mol of diethyl zinc.

5. The catalyst for copolymerization of carbon dioxide and epoxy of claim 2, wherein the magnetic stirring is performed under a condition of 200 to 400 r/min stirring at 60° C. for 2.5 hours.

6. A method for catalyzing the copolymerization of carbon dioxide, epoxy cyclohexane and ethylene oxide to prepare polycarbonate using the ternary composite catalyst of diethylzinc and yttrium trifluoroacetate loaded on chitin of claim 1, comprising:

adding the ternary composite catalyst of diethylzinc and yttrium trifluoroacetate loaded on chitin of claim 1, cyclohexane oxide, ethylene oxide and tetrahydrofuran into a dry 300-ml high-pressure reactor under nitrogen atmosphere;

introducing carbon dioxide and adjusting a pressure to 4 MPa; and stirring at 80° C. for 9 hours at 1000 r/min to obtain polycarbonate.

7. The method of claim 6, wherein the molar ratio of cyclohexane oxide, ethylene oxide and the diethylzinc of the ternary composite catalyst is 20:5:0.25 to 2.

8. The method of claim 6, wherein 5 ml of tetrahydrofuran is added to each 0.1 mol of cyclohexane oxide.

* * * * *